United States Patent
Åhlberg

(10) Patent No.: US 10,836,249 B2
(45) Date of Patent: Nov. 17, 2020

(54) CAPLESS CLOSURE DEVICE FOR A FUEL TANK FILLER NECK OF A VEHICLE AND A VEHICLE INCLUDING SUCH A DEVICE

(71) Applicant: Volvo Car Corporation, Gothenburg (SE)

(72) Inventor: Johan Åhlberg, Vanersborg (SE)

(73) Assignee: Volvo Car Corporation, Gothenburg (SE)

(*) Notice: Subject to any disclaimer, the term of this patent is extended or adjusted under 35 U.S.C. 154(b) by 0 days.

(21) Appl. No.: 16/285,541

(22) Filed: Feb. 26, 2019

(65) Prior Publication Data

US 2019/0299774 A1    Oct. 3, 2019

(30) Foreign Application Priority Data

Mar. 29, 2018 (EP) .................................... 18165048

(51) Int. Cl.
*B60K 15/04* (2006.01)

(52) U.S. Cl.
CPC .......... *B60K 15/04* (2013.01); *B60K 15/0406* (2013.01); *B60K 2015/0419* (2013.01); *B60K 2015/0429* (2013.01); *B60K 2015/0451* (2013.01); *B60K 2015/0461* (2013.01)

(58) Field of Classification Search
CPC ................ B60K 15/04; B60K 15/0406; B60K 2015/0429; B60K 2015/0461; B60K 2015/0451; B60K 2015/0419; B60K 2015/048
See application file for complete search history.

(56) References Cited

U.S. PATENT DOCUMENTS

| 5,595,222 A * | 1/1997 | Thompson ....... B60K 15/03519 |
| | | 137/588 |
| 9,873,322 B2 | 1/2018 | Frank et al. |
| 2017/0072789 A1* | 3/2017 | Frank ..................... B60K 15/04 |

FOREIGN PATENT DOCUMENTS

| EP | 1738949 A1 | 1/2007 |
| FR | 2861655 A1 | 5/2005 |
| WO | 20090135954 A2 | 11/2009 |

OTHER PUBLICATIONS

Sep. 17, 2018 European Search Report issue on International Application No. EP18165048.

* cited by examiner

*Primary Examiner* — Craig M Schneider
*Assistant Examiner* — Jason K Niesz
(74) *Attorney, Agent, or Firm* — Clements Bernard Walker; Christopher L. Bernard

(57) ABSTRACT

A capless closure device including a body, an end plate provided with a circular opening adapted for receiving a fuel nozzle, and a flap door adapted to close the circular opening, where the capless closure device includes a latch edge arranged at the lower edge of the circular opening and a spaced apart sealing edge, and where an inlet drain opening is arranged between the latch edge and the sealing edge. The advantage of the invention is that a capless closure device with an integrated drain passage is provided in a cost-effective way.

15 Claims, 2 Drawing Sheets

CAPLESS CLOSURE DEVICE FOR A FUEL TANK FILLER NECK OF A VEHICLE AND A VEHICLE INCLUDING SUCH A DEVICE

CROSS-REFERENCE TO RELATED APPLICATION

The present patent application/patent claims the benefit of priority of co-pending European Patent Application No. 18165048.2, filed on Mar. 29, 2018, and entitled "CAPLESS CLOSURE DEVICE FOR A FUEL TANK FILLER NECK OF VEHICLE AND A VEHICLE COMPRISING SUCH A DEVICE," the contents of which are incorporated in full by reference herein.

TECHNICAL FIELD

The present invention relates to a capless closure device for closing a refueling port of a vehicle, where the closure device comprises an integrated water drainage.

BACKGROUND ART

Vehicles comprising an internal combustion engine are subjected to a plurality of different legislative requirements and regulations. One of these requirements and regulations is directed to fuel vapour emissions while refuelling a vehicle. Different countries or markets may have different requirements. In some countries, the size of the fuel inlet is specified such that it corresponds to the filler nozzle in order to be able to minimize the fuel vapour emissions during refuelling. In some countries, there is a return conduit which collects the fuel vapour emissions and returns them to the fuel supply tank. The fuel filler nozzle may also be provided with a rubber sleeve adapted to seal the fuel port of the vehicle.

The filler neck of the vehicle for a vehicle comprising an internal combustion engines using a liquid fuel, e.g. diesel or gasoline, may include a capless closure at the filler inlet of the filler neck coupled to a fuel tank for replenishing fuel in the tank. Such a capless fuel inlet may include a fuel valve or sealing door which remains closed to seal off the fuel system and reduce fuel vapour emissions from the fuel tank to the external atmosphere. The fuel valve or sealing door on the capless fuel inlet may be opened by inserting a fuel nozzle into the fuel inlet during refuelling. Furthermore, the capless fuelling port may be designed to collect and drain residual fuel and contaminants left in the fuel port after the fuel nozzle is removed at the end of refuelling.

Some filler necks comprising a capless closure may be relatively shallow, such that contaminants such as rain water and dirt can drain without the need for an additional drain tube. One disadvantage of such a solution is that the latching edge for the filler nozzle is the same as the sealing edge for the sealing of the closure flap of the capless closure. When the latching edge wears due to wear from the filling nozzle, the sealing edge will degrade and may cause leakage, such that contaminants may enter the inlet opening to the gas tank or that fuel vapour emissions may escape the vehicle fuel system.

Other proposed solutions separate the latching edge for the filler nozzle from the sealing edge of the closure flap, by making the filler neck deeper, such that the latching edge and the sealing edge are separated in distance from each other. With such a deep filler neck, a drain tube must be positioned between the latching edge and the sealing edge in order to be able to drain contaminants. In order to comply with certain regulations, the opening of the drain tube must be closed during refuelling. Such a solution adds complexity and parts to the design of the filler neck.

U.S. Pat. No. 9,873,322 B2 discloses an example of a capless fuelling port attached to a fuel tank of a vehicle. The fuelling port is adapted to conduct fuel towards the fuel tank of a vehicle. The capless fuelling port includes a fuel-tank filler neck for conducting fuel to the fuel tank and a capless closure assembly that couples to the fuel-tank filler neck in such a way so as to be removed for serviceability. In this way, the capless closure assembly can be replaced if the sealing edge is worn and leakage occurs.

Even though these solutions may function properly, at least for some time, there is still room for improvements.

SUMMARY

An object of the invention is therefore to provide an improved capless closure device comprising a drain passage. A further object of the invention is to provide a vehicle comprising such a device.

In a capless closure device comprising a body, an end plate provided with a circular opening adapted for receiving a fuel nozzle, and a flap door adapted to close the circular opening, where the capless closure device comprises a latch edge arranged at the lower edge of the circular opening, the object of the invention is achieved in that the capless closure device comprises a sealing edge spaced apart from the latch edge in a vertical direction, where an inlet drain opening is arranged between the latch edge and the sealing edge.

By this first embodiment of a capless closure device, a capless closure device comprising an integrated drain passage is provided. The drain passage is closed off during refuelling of the vehicle in a passive way by the rubber sleeve of a fuel nozzle, such that no additional closing covers or the like are required. In this way, a simplified drainage of a capless closure device is obtained. The invention is made possible by separating the latch edge for the fuel nozzle from the sealing edge for the sealing of the flap door. By this separation in a vertical direction, wear of the latch edge will not influence the sealing of the flap door since the sealing edge will be positioned below the latch edge. The flap door will thus be sealed in a tight manner throughout the life of the vehicle, regardless of the wear of the latch edge.

According to one example embodiment, the outlet drain opening exits in the bearing surface of the capless closure device, which is the surface surrounding the circular filler opening of the fuel tank filler neck. When a fuel nozzle is inserted into the filler opening, the rubber sleeve of the fuel nozzle will bear on the bearing surface and the width of the edge of the rubber sleeve will cover the outlet drain opening of the drain passage. In this way, no fuel vapour emissions may escape the fuel tank filler neck during refuelling.

The capless closure device is adapted to be mounted in a vehicle, which may comprise a diesel combustion engine or a gasoline combustion engine. The vehicle may be powered solely by the combustion engine, or may be a hybrid vehicle.

BRIEF DESCRIPTION OF THE DRAWINGS

The invention will be described in greater detail in the following, with reference to the attached drawings, in which.

DESCRIPTION OF EMBODIMENTS

The embodiments of the invention with further developments described in the following are to be regarded only as examples and are in no way to limit the scope of the protection provided by the patent claims.

Figure 1:
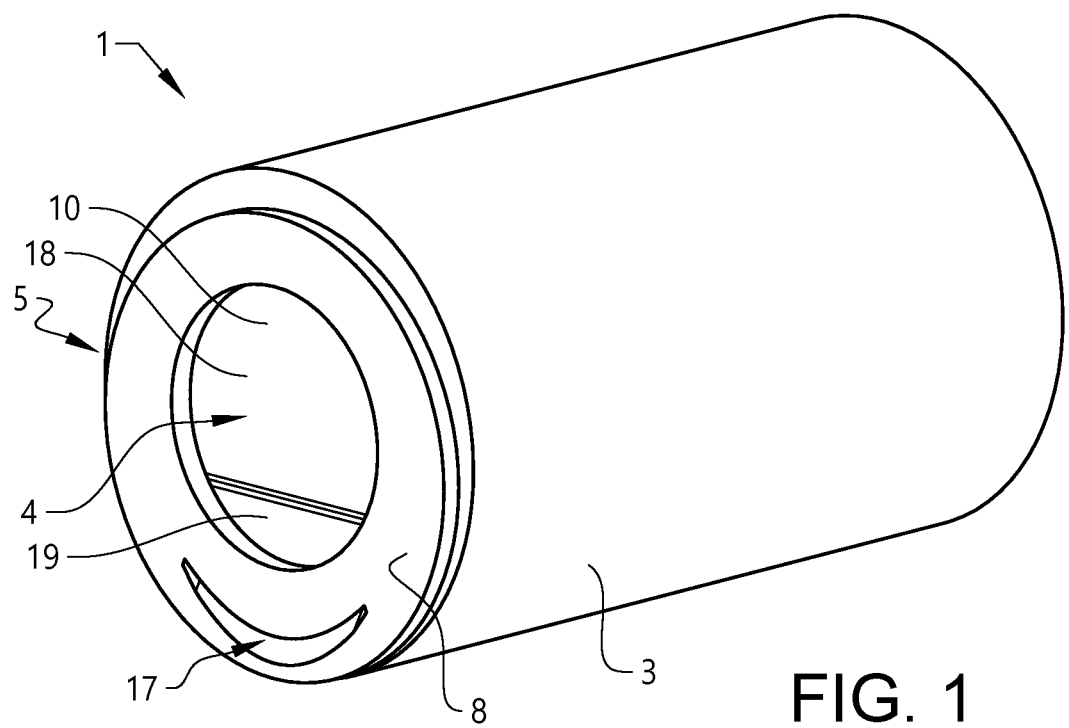
FIG. 1 shows a view of a capless closure device according to the invention.
Figure 2:
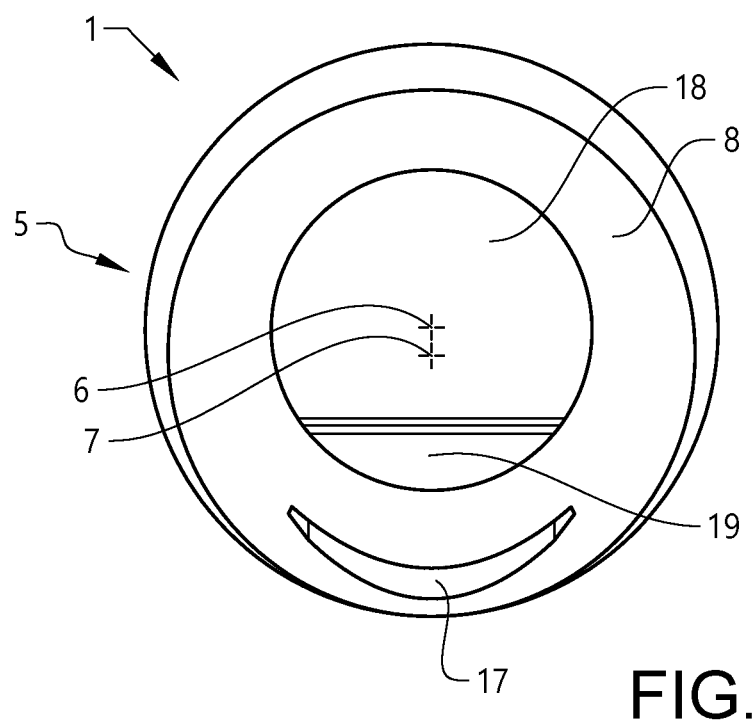
FIG. 2 shows a front view of a capless closure device according to the invention.
Figure 3:
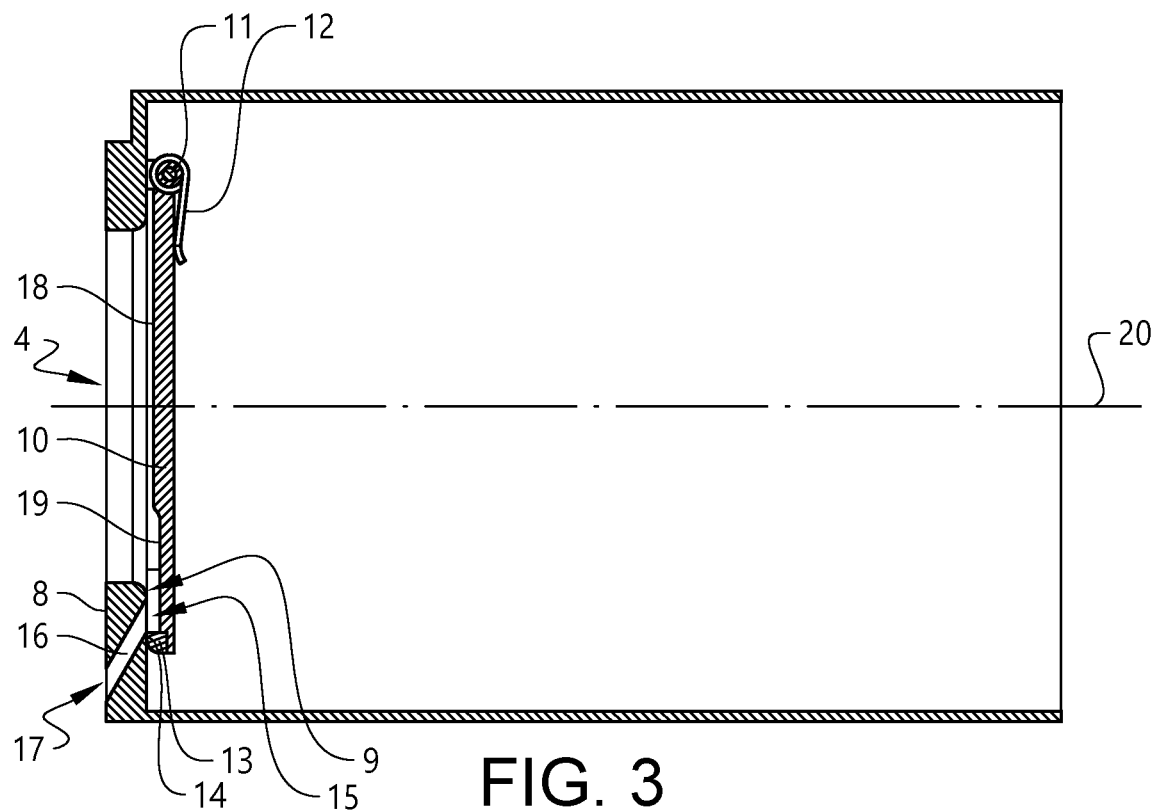
FIG. 3 shows a cut side view of a capless closure device according to the invention.
Figure 4:
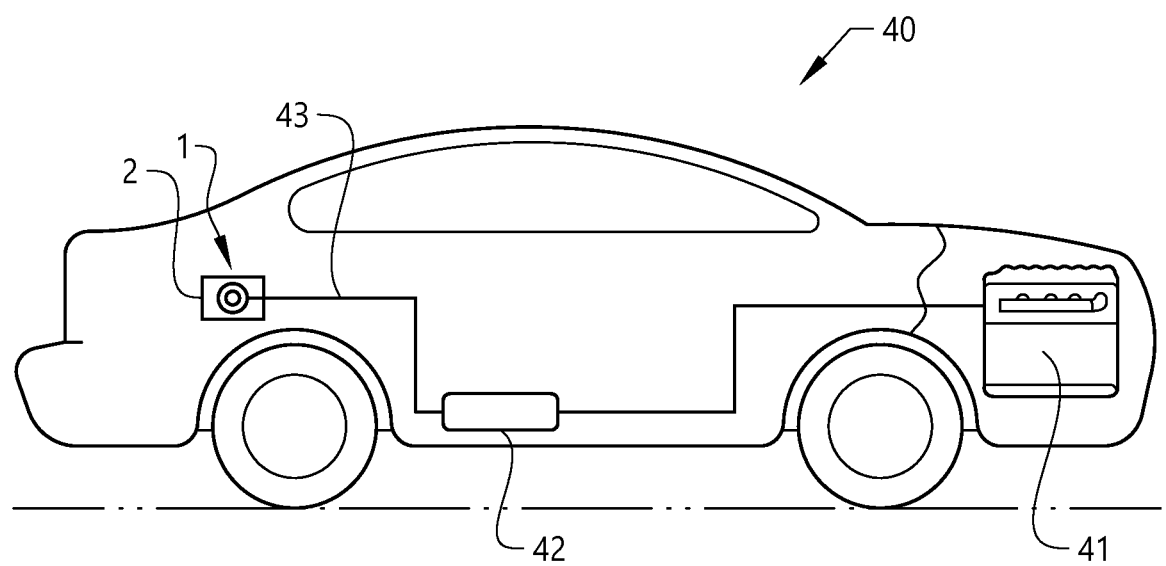
FIG. 4 shows a vehicle comprising a capless closure device according to the invention.

FIGS. 1 to 3 show a first embodiment of a capless closure device, and FIG. 4 shows a vehicle comprising such a capless closure device.

The capless closure device 1 comprises in the shown example a tube shaped housing 3 to be comprised in a fuel tank filler neck 2 of the fuel system of a vehicle. The body 3 comprises in one end an end plate 5 provided with a circular opening 4 adapted to receive a fuel nozzle. The end plate 5 is circular and provided with a bearing surface 8. The circular opening 4 is in the shown example positioned asymmetrically in the bearing surface 8, with the centre 6 of the circular opening 4 displaced from the centre 7 of the bearing surface 8. Depending on the size of the end plate, the bearing surface may also be positioned in a symmetric way. The diameter of the end plate must correspond to the outer diameter of the rubber sleeve of the fuel nozzle. One purpose of arranging the circular opening in an asymmetric manner is to be able to cover an outlet drain opening with a rubber sleeve of the fuel nozzle when refuelling.

The bearing surface 8 is adapted to receive a rubber sleeve of a fuel nozzle. The rubber sleeve will bear on the bearing surface 8 when the fuel nozzle is inserted through the circular opening 4, and will provide a seal between the capless closure device and the fuel nozzle. In this way, no fuel vapour emissions may escape during refuelling. The diameter of the bearing surface is preferably adapted to the size of the rubber sleeve or to other legislative requirements, and is in the shown example in the range between 52-58 mm.

The capless closure device 1 is further provided with a flap door 10 adapted to close the circular opening 4. The flap door 10 is arranged at the inner side of the circular opening, inside the body 3 of the capless closure device. The flap door 10 is pushed open by the fuel nozzle when the fuel nozzle is inserted through the circular opening. The flap door 10 comprises a hinge 11 around which the flap door pivots from the closed position to the open position and back again. The flap door is in the shown example provided with a resilient means 12, e.g. a coil spring, which pushes the flap door to the closed position. The flap door 10 is provided with a sealing 13 around the circumferential edge of the flap door.

The sealing 13 is adapted to seal the circular opening when the flap door is closed, such that no fuel vapour emissions can escape the fuel tank filler neck. In order to be able to provide a secure sealing of the flap door during the entire life of the vehicle, the latch edge adapted to hold the fuel nozzle is separated from the sealing edge adapted to seal the flap door in a vertical direction. The flap door is provided with a protrusion on the outer side, such that the fuel nozzle can open and glide on the flap door without damaging the sealing 13.

The circular opening 4 is provided with a latch edge 9 at the lower inner edge of the circular opening. The latch edge is adapted to receive the fuel nozzle and to cooperate with latching means of the fuel nozzle, such that the fuel nozzle can be positioned and held in the filler neck during the refuelling, without the need for a user to hold the fuel nozzle during the refuelling. In the inventive capless closure device, the latch edge and the sealing edge are separated from each other in a vertical direction, i.e. the latch edge is arranged above the sealing edge. The latch edge will thus be able to hold the fuel nozzle and will inevitable wear from the contact with the latching means of the fuel nozzle. However, since the sealing edge is separated from the latch edge, the latch edge is allowed to wear without affecting the sealing of the flap door.

The latch edge and the sealing edge are in the shown example arranged in the same vertical plane. In order to provide a good drainage, the flap door 10 is thus provided with a recess 19 adapted to increase the clearance between the outer side 18 of the flap door and the latching edge 9. The shape and size of the recess may vary, but it is arranged at the lower part of the flap door, at the inlet drain opening 15. It is also possible to arrange the latch edge in a plane somewhat in front of the plane of the sealing edge. In this case, the recess of the flap door may not be required, as long as a good drainage is ensured. The latch edge may also be arranged in a plane somewhat behind the plane of the sealing edge. In this case, the recess of the flap door must be adapted to the additional depth of the latch edge.

The sealing edge 14 for the flap door is positioned lower than the latch edge in a vertical direction. Between the latch edge and the sealing edge, there is arranged an inlet drain opening 15 leading to a drain passage 16, which exits in an outlet drain opening 17 in the bearing surface 8. The inlet drain opening 15 will allow contaminants such as water and dirt to drain away from the fuel tank filler neck. The lower part of the outer side 18 of the flap door 10 is in the shown example provided with a recess 19 which will simplify the drainage of e.g. rain water through the drain passage. In the shown example, the inlet drain opening 15, the drain passage 16 and the outlet drain opening 17 are provided with a semi-circular shape, but other shapes are of course also possible, such as a V-shape or a plurality of separate smaller openings.

The outlet drain opening 17 is arranged in the bearing surface 8. By arranging the outlet drain opening 17 in the bearing surface 8 of the end plate 5, it is ensured that the rubber sleeve of a fuel nozzle will cover the outlet drain opening during refuelling, such that no fuel vapour emissions will escape during refuelling and such that no external air is sucked into the fuel nozzle through the drain passage due to the negative pressure in the fuel supply system. A further advantage of this solution is that no additional components are required in order to close the drain passage during refuelling. This simplifies the design considerably and reduces the number of required components.

The tubular body is provided with a centre line 20, which as reference is arranged in a horizontal direction of the body. The capless closure device will be mounted in the fuel tank filler neck of the vehicle with an inclination, such that the centre line 20 is inclined with respect to a horizontal plane of the vehicle. In one example, the tubular body is mounted in the vehicle with an inclination of 35 degrees relative the horizontal plane of the vehicle. At the same time, the drain passage is provided with an inclination from the inlet drain opening to the outlet drain opening. This inclination of the drain passage may e.g. be 60 degrees with respect to the centre line 20 of the body 3. It is important that the drain passage will allow e.g. water to drain when the fuel tank filler neck is mounted in a vehicle. The inclination of the drain passage is thus adapted to the mounting position of the capless closure device in the vehicle. With a mounting angle of 35 degrees and an inclination of the drain passage of 60 degrees, an effective inclination of the drain passage will be 25 degrees when mounted in a vehicle, which is sufficient for a reliable drainage. Other angles are possible. It is however important that the outlet drain opening exits in the bearing surface 8 of the end plate, such that the outlet drain opening is covered by the rubber sleeve of a fuel nozzle when refuelling.

The body 3 of the capless closure device may be made from a plastic material, e.g. by injection moulding of the body. The plastic material is preferably fibre reinforced in order to increase the wear resistance. It is also possible to provide a metallic insert at the latch edge in order to increase the wear resistance further. However, with the inventive solution, where the latch edge and the sealing edge are separated, some wear of the latch edge is allowed without affecting the sealing of the flap door. For this reason, it is possible to select a more cost-effective material for the body. The material of the body may further be a conductive material, such that a voltage potential difference between the fuel nozzle and the capless closure device can be transferred to ground potential. The flap door may be made from a metal sheet or may also be injection moulded in a plastic material.

FIG. 4 shows a vehicle 40 comprising a combustion engine 41, which may be a diesel engine or a gasoline engine. The vehicle may be powered solely by the combustion engine, or may be a hybrid vehicle. The vehicle comprises a fuel tank 42 with a fuel conduit 43 connecting the fuel tank to the fuel tank filler neck 2 comprising the capless closure device 1. A tank cover door is preferably arranged outside of the capless closure device, both to protect the capless closure device from outer influence and for design reasons. The tank cover door will prevent most rain water and water from a car wash to enter the fuel tank filler neck. However, some water may enter and there may be some condensation which may collect at the capless closure device. It is thus of advantage to use a drain passage to drain away any unwanted water and dirt from entering the fuel system of a vehicle.

The invention is not to be regarded as being limited to the embodiments described above, a number of additional variants and modifications being possible within the scope of the subsequent patent claims.

The invention claimed is:

1. A capless closure device comprising a body extending along a centre line thereof, an end plate provided with a circular opening adapted for receiving a fuel nozzle, and a flap door adapted to close the circular opening, wherein the capless closure device comprises a latch edge arranged at a lower edge of the circular opening and a sealing edge spaced apart from the latch edge in a direction perpendicular to the centre line of the body, wherein the latch edge and the sealing edge are positioned in a same plane, wherein an inlet drain opening is arranged between the latch edge and the sealing edge, wherein the end plate comprises a bearing surface adapted to receive a rubber sleeve of a fuel nozzle, wherein the outlet drain opening is positioned in the bearing surface.

2. The device according to claim 1, wherein the flap door comprises a recess arranged at the inlet drain opening when the flap door is in a closed state.

3. The device according to claim 1, wherein the flap door comprises a circumferential sealing adapted to cooperate with the sealing edge.

4. The device according to claim 1, wherein the latch edge and the sealing edge are positioned in the same plane perpendicular to the centre line of the body.

5. The device according to claim 4, wherein the flap door comprises a circumferential sealing adapted to cooperate with the sealing edge.

6. The device according to claim 1, wherein the inlet drain opening is connected to an outlet drain opening by a drain passage.

7. The device according to claim 6, wherein the drain passage is inclined with respect to the centre line of the body with an angle between 30 to 60 degrees.

8. A vehicle comprising the device according to claim 1.

9. The vehicle according to claim 8, wherein the capless closure device is mounted with an angle in the vehicle, such that the centre line of the body of the capless closure device is inclined with respect to a horizontal plane of the vehicle.

10. The vehicle according to claim 9, wherein the centre line of the body of the capless closure device is inclined by between 25 to 45 degrees with respect to the horizontal plane of the vehicle.

11. A capless closure device comprising a body extending along a centre line thereof, an end plate provided with a circular opening adapted for receiving a fuel nozzle, and a flap door adapted to close the circular opening, wherein the capless closure device comprises a latch edge arranged at a lower edge of the circular opening and a sealing edge spaced apart from the latch edge in a direction perpendicular to the centre line of the body, wherein an inlet drain opening is arranged between the latch edge and the sealing edge, wherein the end plate comprises a bearing surface adapted to receive a rubber sleeve of a fuel nozzle, wherein the outlet drain opening is positioned in the bearing surface.

12. The device according to claim 11, wherein the latch edge and the sealing edge are positioned in a same plane perpendicular to the centre line of the body.

13. The device according to claim 11, wherein the flap door comprises a recess arranged at the inlet drain opening when the flap door is in a closed state.

14. The device according to claim 11, wherein the inlet drain opening is connected to an outlet drain opening by a drain passage.

15. The device according to claim 14, wherein the drain passage is inclined with respect to the centre line of the body with an angle between 30 to 60 degrees.

* * * * *